UNITED STATES PATENT OFFICE.

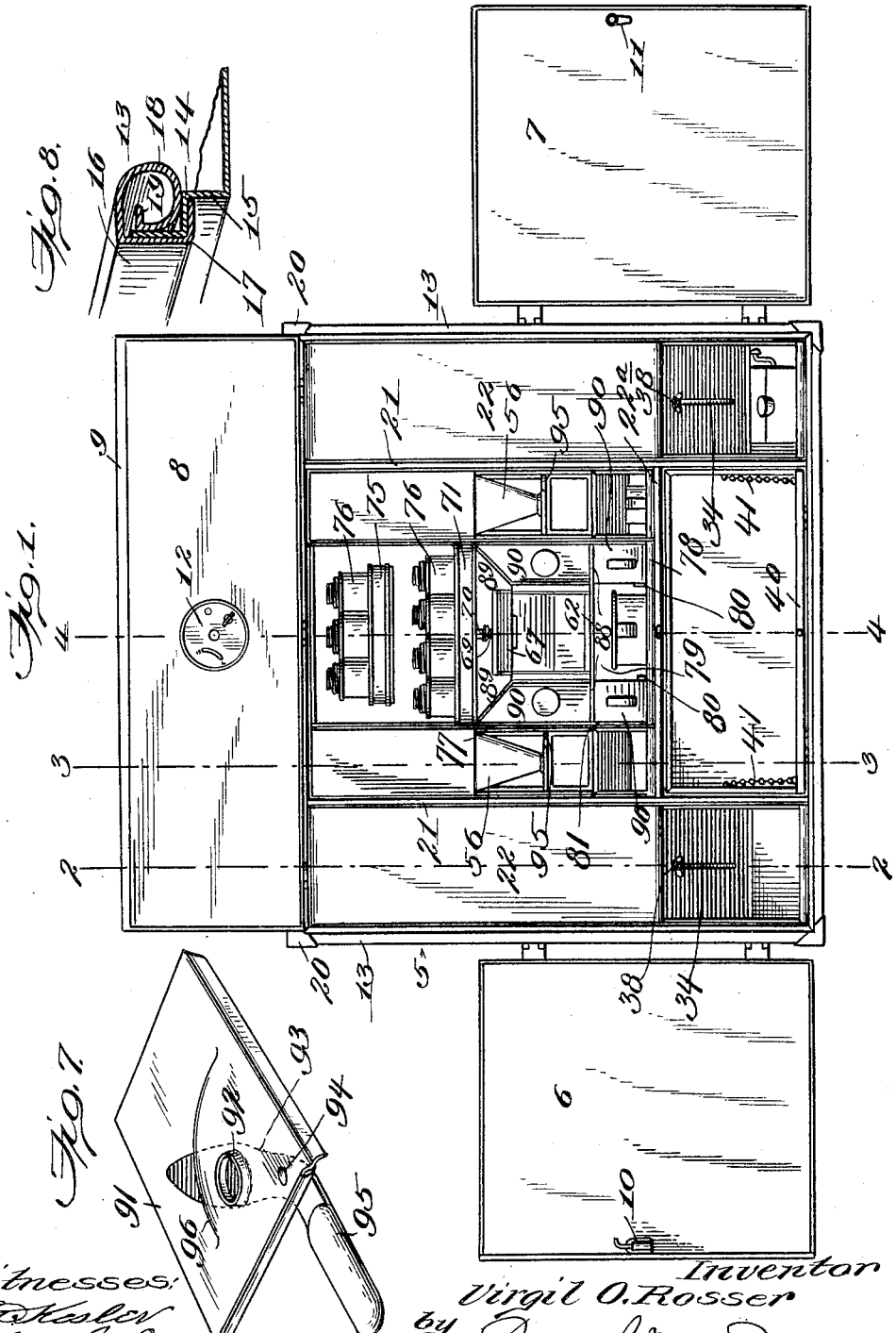

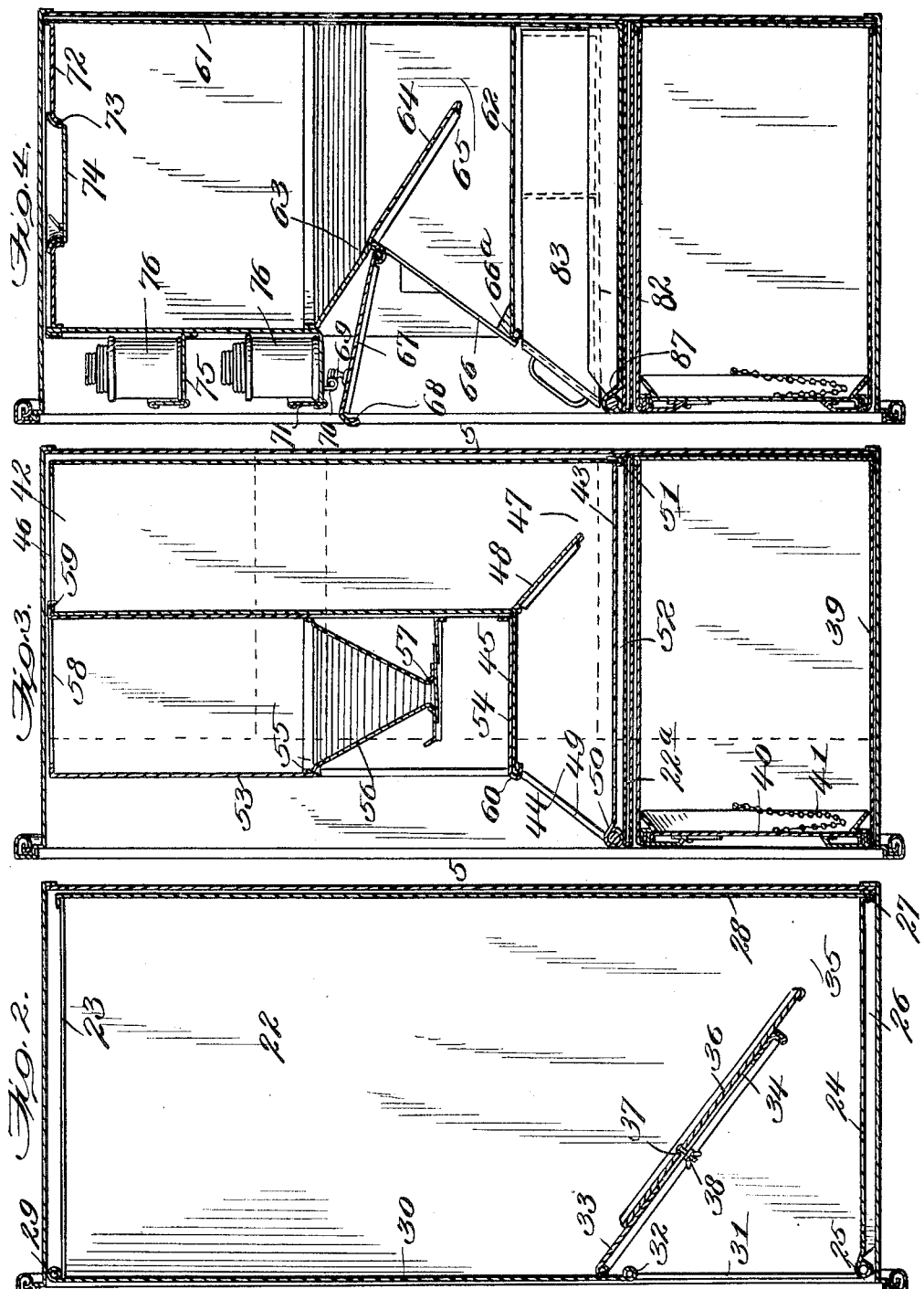

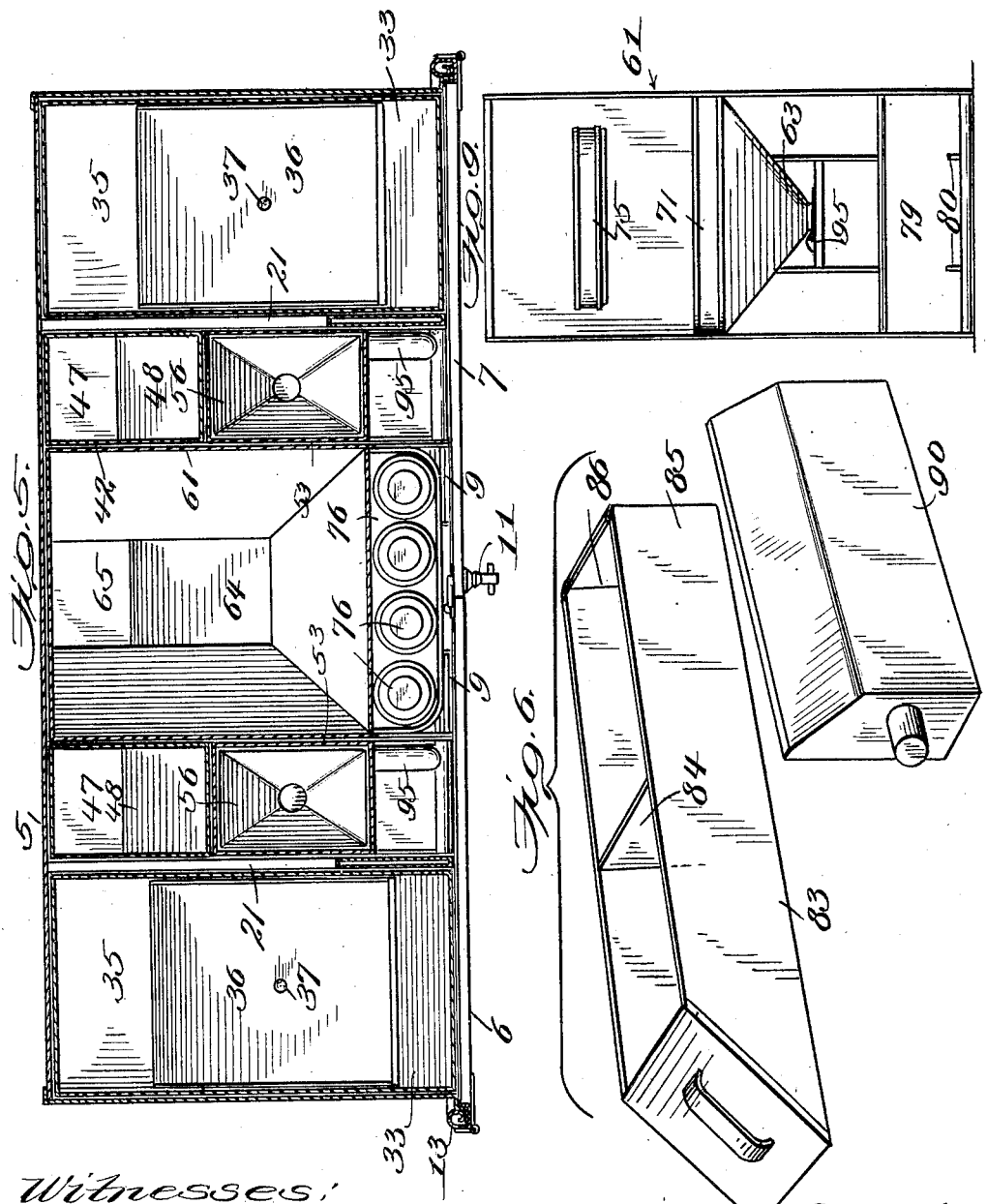

VIRGIL O. ROSSER, OF DALLAS, TEXAS.

KITCHEN-CABINET.

1,088,455.  Specification of Letters Patent.  Patented Feb. 24, 1914.

Application filed December 1, 1911. Serial No. 663,242.

*To all whom it may concern:*

Be it known that I, VIRGIL O. ROSSER, a citizen of the United States, residing at Dallas, in the county of Dallas and State of Texas, have invented new and useful Improvements in Kitchen-Cabinets, of which the following is a specification.

This invention relates to kitchen cabinets of that type embodying a plurality of compartments for containing flour, cornmeal, sugar and other culinary materials, and the primary object of the same is to provide within minimized proportions a cabinet having a maximum containing capacity and also to have all of the parts or components including the several compartments freely removable from and insertible in an outer inclosing casing to render the said compartments or components readily accessible for filling or supplying the same with materials which they are adapted to hold, and also to facilitate cleaning the same and thus render the device as an entirety advantageous from a hygienic standpoint.

A further object of the invention is to provide a kitchen cabinet having a strong and durable as well as convenient organization wherein the several parts are comparatively simple in their construction and arrangement and fully inclosed within an outer casing devoid of filling openings through the top and ends thereof, the casing having conveniently opening doors at the front for rendering the compartments and their contents readily accessible.

With these and other objects and advantages in view the invention consists in the construction and arrangement of the several parts which will be more fully hereinafter described and claimed.

In the drawings: Figure 1 is a front elevation of a kitchen cabinet shown open and embodying the features of the invention. Fig. 2 is a transverse vertical section on the line 2—2, Fig. 1. Fig. 3 is a transverse vertical section on the line 3—3, Fig. 1. Fig. 4 is a transverse vertical section on the line 4—4, Fig. 1. Fig. 5 is a horizontal section through the upper portion of the cabinet showing the front of the latter fully closed. Figs. 6, 7 and 8 are detail views of parts of the cabinet. Fig. 9 is a detail front elevation of a modified form of a portion of the cabinet.

The numeral 5 designates the outer inclosing casing constructed of suitable sheet metal and having imperforate top, bottom, ends and rear side and an open front which is normally closed by two lower side opening doors 6 and 7 and an upper drop door 8 hinged at its upper edge to the top margin of the front and provided with a flange 9 along its lower edge against which the doors 6 and 7 are closed to prevent opening of the said drop door prior to the release and opening of the doors 6 and 7. The doors 6 and 7 are provided with suitable locking devices 10 and 11, the locking device 10 being preferably in the form of a vertical slide bolt to engage a part of the interior structure of the cabinet, and the locking device 11 is in the form of a turn-button or crank arm to lock in engagement with the inner side portion of the door 6. The drop door 9 will also have a clock 12 set in the central portion thereof and exposed through the front of the cabinet. The margin or rim 13 around the front open side of the cabinet is reinforced or strengthened to give the same sufficient rigidity and wearing durability through the medium of a composite beading, as shown by the detail section in Fig. 8, the top and bottom sides and the ends being formed with an L-bend 14 continuous with an angular flange member 15 and embraced or snugly inclosed by a metallic bead 16 having a semirectangular bent portion or body 17 against which the L-bend or member 14 has bearing, said bead also having a curved member 18 continuing from the semirectangular body 17 and turned into the latter to bear against a portion of the L-bend or member 14 and terminating in an angular stiffening flange 19 which is projected into the space formed within the said bead. The bead 16 and the L-bend 14 together with the flange 15 may be shaped and formed as well as associated by any suitable mechanism adapted for the purpose, and these associated parts need not be soldered except at the corners of the rim, and over these corners additional angular reinforcing strips 20 are applied and secured.

The interior of the body of the casing has two dividing partitions 21 adjacent to opposite ends and of open structure interiorly of the casing, and a horizontal partition or support 22ª, and all of the compartments, bins and supporting devices or chambers are separably removable from the casing for convenience in cleaning the interior of the casing and the coördinate elements, and for the further purpose of permitting the several compartments or bins to be filled or supplied with the material which they are adapted to hold. A decided advantage results from this separable organization from a hygienic standpoint, and by inclosing the several bins and compartments within the casing and rendering the inlet openings thereto inaccessible from the exterior of the casing when the doors 6, 7 and 8 are closed, the entrance of dust and dirt as well as bugs, flies and mice or other pests into the compartments or bins is prevented.

In the spaces between the partitions 21 and the ends of the casing, bins 22 are removably mounted and extend fully from the bottom to the top of the casing, as shown by Fig. 2, the upper ends of these bins being fully open as at 23 and normally closed by the top of the casing. The bottom 24 of each bin 22 has a bead or roll 25 along its front edge, side flanges 26 and a rear supporting projection 27 constructed by the joint between the bottom 24 and the rear wall 28 of the bin. By this means the bottom 24 of the bin is supported above the bottom of the casing with advantages in removing the bin from and inserting it in the casing. The bin 22 at its upper front edge is also formed with a bead or roll 29 projecting above the same and engaging the front portion of the top of the casing when the bin is in place to close the short space between the top of the bin and the top of the casing, the lower bead or roll 25 also acting as a front closing means at the bottom of the bin relatively to the adjacent front portion of the casing. The front 30 of the bin 22 is closed except at the lower portion thereof, where an exit opening 31 is formed for withdrawing the contents of the bin, the lower terminal of the front 30 forming the upper margin or limit of the opening 31 being constructed with a reinforcing inwardly bent bead or roll 32, the bead or roll 25 of the bottom 24 constituting the lowermost limit or margin of the opening 31. The opening 31 extends the full width of the lower portion of the bin 22 and the side walls of the latter are imperforate.

Located in the lower portion of the bin and extending downwardly from a point slightly above the bead or roll 32 is an inclined chute 33 formed with a central slot 34, the said chute or downwardly and rearwardly inclined supplemental bottom 33 extending only far enough rearward to provide an outlet 35 adjacent to the rear wall of the bin for the contents of the latter. The size or dimensions of the outlet or opening 35 is controllable or adjustable by a slide plate or valve 36 shiftably mounted on the supplemental bottom 33 and having a bolt rod 37 secured thereto and slidably mounted in the slot 34, the said bolt rod being engaged by a suitable clamping nut 38 which is readily accessible through the opening 31 to permit adjustment of the slide valve 36 as may be desired.

The horizontal partition 22ª connects the partitions 21 and is located at a suitable distance above the bottom of the casing to form a chamber in which a bread or cake box 39 is removably mounted and provided with a front drop door 40 hinged at its lower edge and provided with limiting chains 41 to permit the same to be lowered only to a horizontal position. Above the horizontal partition 22ª and supported thereby are various compartments or receptive chambers for smaller bins, but aside from the partitions 21 and 22ª no other dividing means are disposed within the casing and all of the coördinate elements of the cabinet above the horizontal partition 22ª and between the partitions 21 are freely removable.

Adjacent to the inner side of each vertical partition 21 is a double bin composed of separable parts which are unitedly withdrawable from and insertible in the spaces or chambers allotted therefor and comprising a rear main bin 42 having a closed bottom 43 projected fully to the front with sides 44 projected at their lower portions to form supporting means for a supplemental bottom 45 or a horizontal rest which extends only partially rearward relatively to the sides of the main bin 42 to avoid interfering with the outflow from the lower portion of the latter. The top of the main bin 42, as at 46, is fully open and is normally closed by the top of the inclosing casing, as shown by Fig. 3, so that by drawing the bin as a whole outwardly the said main bin 42 may be rendered interiorly accessible for filling or otherwise treating or cleaning the same. The outlet opening 47 at the bottom of the bin 42 is somewhat restricted by a rearwardly and downwardly inclined chute or direction plate 48 which terminates at such distance in advance of the rear and bottom walls of the said bin as to render the outflow of the contents of the bin fully controllable. The material issuing through the outlet 47 of the bin 42 falls on the bottom 43 and is reached through an outlet opening 49 between the lower extended portions of the sides 44, the latter being inclined upwardly and rearwardly at their front edges to provide a suitable clearance and also to assist in giving as extensive bottom support for the contents of the bin 42 issuing from the outlet 47 as possible. The front edge of the bottom 43 is formed with a bead or roll 50 which, with a rear depending projection 51, operates to hold the bottom 43 out of contact with the horizontal partition 22ª, and to strengthen the bottom 43, side flanges 52 depend therefrom and also rest on the said horizontal partition. The secondary bin 53 has a bottom 54 which rests on the horizontal support 45, and at a suitable distance above the bottom 54 this secondary bin is provided with a supplemental bottom 55 having a hopper outlet 56 provided at its lower contracted extremity with a suitable form of cutoff valve 57, the preferred structure of which will be more fully hereinafter explained. The hopper outlet 56 and its cutoff valve or slide at the bottom terminates a suitable distance above the bottom 54 to permit the introduction and removal of a containing receptacle or device, such as a cup, below the said hopper outlet. The upper extremity of the bin 53 is also fully open as at 58 and normally closed by the top of the casing 5, and at the upper terminal of the rear wall of this secondary bin and also at the front terminal of the bottom 54 are hook flanges 59 and 60 which respectively catch over the upper edge of the front wall of the main bin 42 and the front edge of the horizontal support 45 to hold the said secondary bin 53 practically associated with the main bin when inserting the double bin in place or withdrawing the same from the casing 5, the said hook flanges preventing separation or application thereof relatively to the main bin 42 until the double bin has been withdrawn far enough to fully clear the upper extremity of the secondary bin and a portion of the front wall of the main bin from the top of the casing 5. These double bins as well as the bins 22 may be used for containing any material desired, and the larger bins 22 have been particularly devised for holding flour and cornmeal or other analogous bulky product.

The structure between the bins 42 is removable as a whole and mainly consists of a sugar bin 61 having a bottom 62 forming a dividing partition for a purpose which will be presently explained, and a hopper outlet 63 having a rearwardly and downwardly inclined chute or direction plate 64 extending partially toward the back wall to form a restricted outlet opening 65 above the said bottom, the front edge of the bottom 62 being provided with a guard or wedge shaped rib 66ª in a manner similar to the construction of the outlet of the bin 42 heretofore described. The outlet of the sugar bin 61 as just explained is normally closed by a drop door 67 hinged at its upper edge, as shown by Fig. 4, and having a spring catch 68 at its lower free edge to engage over the front edge of the bottom 62 and also provided with a knob or projection 69 on the outer side thereof at a suitable distance from the lower free edge to frictionally engage a resilient catch 70 depending from the bottom of a flanged shelf or gallery 71 secured to the front wall of the bin 61. The top 72 of the bin 61 is formed with an inlet opening 73 which is adapted to be closed by a cover 74 depressible into the opening and frictionally engaging the wall of the latter. If desired, however, the top 72 may be left partially open for filling and cleaning purposes and be normally closed by the top of the inclosing casing 5. In addition to the flanged shelf or gallery 71 above referred to, a smaller shelf or gallery 75 is arranged thereabove and also secured to the front wall of the bin 61, the said flanged shelves or galleries serving to removably support a plurality of spice and condiment boxes 76, as clearly shown by Fig. 1. As will be seen from Fig. 1, the sides 66 at the lower portion of the bin are really downward extensions of the hopper 63 or are supplemental to the main sides 77 which continue fully down to the main bottom or lower bottom closure 78 of the central organization including the sugar bin 61, and between the bottom 62 of the said bin and the bottom 78 of the main central structure a central containing compartment 79 for cups or other receptacles is provided, said bottom having flanges 80 extending upwardly a short distance therefrom on opposite sides of the center to define lower side compartments 81 having bottoms 82, as shown by Fig. 4, above the plane of the bottom 78, to receive removable small bins or receptacles 83 of the form shown by Fig. 6 and adapted to contain baking powder and soda or other materials, each of the receptacles 83 having a dividing partition 84 to form a rear extension 85 open at the top, as at 86, that may be used for storing the materials and serve, if desired, as secret compartments. These extensions 85, however, insure positive disposition of the receptacles 83 in the chambers or spaces provided therefor so that the front outlet extremities of said receptacles will always be maintained in line with the front of the central structure and thus made readily accessible. The main bottom 78 at the center or where the chamber 79 is formed, is provided with an upwardly and outwardly extending guard flange 87 to facilitate retention of the devices stored therein. From the supplemental bottom or horizontal support 62 of the sugar bin, lateral extensions 88 are formed, or practically the said extensions 88 and bottom 62 will be integral or constructed from one piece of material, and the said extensions have their outer edges connected to the main sides 77 of the central structure and form with the downwardly and inwardly inclined side bottom walls 89 of the hopper bottom or outlet 63 of the sugar bin compartments on opposite sides of the outlet of the sugar bin to removably receive correspondingly shaped coffee and tea canisters or receptacles 90, as shown by Fig. 6.

Each of the bins 53 will be preferably provided with a cutoff slide of the form shown by Fig. 7, and to accommodate the application of such cutoff slide each hopper will be provided with an extended outlet plate 91 at its lower end fixed to the back wall of the bin 53 and having a front upturned beaded or bent edge and an intermediate flanged outlet, as at 92. Coöperating with the under side of the plate 91 is an angularly deflected flat slide 93 pivotally attached as at 94 and projected forwardly or outwardly from the front edge of the plate 91 and shaped or reinforced to provide a strong gripping handle 95. The rear extremity of the slide 93 is projected through a slot 96 arranged as shown by Fig. 7, the said rear end of the slide being slightly bent to permit it to freely move in the said slot and have the rear terminal thereof closely bear on the upper side of the plate 91. The movement of the slide 93 in opposite directions is restricted by the handle or outwardly projecting portion thereof striking against the one side 77 and the adjacent partition 21 or the outer side wall 44 of the bin 53. This form of cutoff slide is very simple and may be readily applied at a comparatively small cost, and it will be observed that said slide will be held up in close engagement with the under side of the plate 91 at all times and especially when closed to prevent leakage of the contents of the bins 53.

Fig. 9 shows a slight modification in the form of the central organization and particularly in relation to the outlet of the sugar bin 61, and instead of said bin having the gravity outlet provided with the drop door 67 and direction plate 64 as shown by Fig. 4, the hopper outlet 63 is provided with a cutoff slide similar to that shown by Fig. 7 and used with the bins 53.

From the foregoing it will be observed that the containing capacity of the cabinet is large within comparatively small proportions and that the available space is almost fully utilized as means for holding containing receptacles, but despite the numerous bins and receptacles embodied in the cabinet, such bins and receptacles are all readily removable and may be conveniently filled or cleaned and reapplied within the inclosing casing. It is also proposed to modify the proportions and dimensions of the cabinet and to ornament the same exteriorly and interiorly as may be desired. The whole structure is composed of suitable sheet metal which may be of a non-corrosive character or suitably treated to render the same non-corrosive. The cabinet is readily portable and may be either suspended from a support or rest upon a suitable base.

What is claimed is:

1. In a kitchen cabinet, an inclosing casing having an open front provided with both side opening doors and an upper drop door, and a plurality of bins removably mounted in the casing and including a central receptacle organization held above the bottom of the casing and comprising a sugar bin at the center having a bottom forming a dividing partition and an outlet having a rearwardly and downwardly inclined chute or direction plate, a drop door for closing the outlet of the sugar bin, galleries secured to the upper front portion of the bin, the sides of the bin being extended downwardly to the bottom thereof to form a central containing compartment, and removable side bins forming part of the said central organization and disposed one at opposite sides of the sugar bin, spaces being formed at opposite sides of the inclined bottom of the sugar bin for the reception of other bins, the outlet of the sugar bin also provided with containing receptacles at opposite sides thereof.

2. In a kitchen cabinet, the combination of an inclosing casing having doors to render the front of the same fully accessible, a plurality of bins removably mounted in the casing and including a central receptacle organization removable as a unit and including a sugar bin at the upper central portion thereof, chambers for canisters and lower withdrawable receptacles on opposite sides of the center of the said organization, and bins withdrawably mounted in the central receptacle organization at opposite sides of the sugar bin.

3. In a kitchen cabinet, an inclosing casing with a fully open front, doors hinged to the casing and adapted to clear the front of the latter, and a plurality of bins removably mounted in the casing and including a central bin organization held above the bottom of the casing and comprising a central sugar bin with an outlet above the bottom of the said organization and having removable receptacles at opposite sides of the outlet, and other receptacles at opposite sides below the outlet, an open space being formed between the latter receptacles, and side bins in the central organization removable independently from said organization and also having outlets adjacent to the bottom of the organization.

In testimony whereof I have hereunto set my hand in presence of two subscribing witnesses.

VIRGIL O. ROSSER.

Witnesses:
M. E. FLYNN,
H. D. MARTIN.

Copies of this patent may be obtained for five cents each, by addressing the "Commissioner of Patents, Washington, D. C."